US009767605B2

(12) United States Patent
Arrasvuori et al.

(10) Patent No.: US 9,767,605 B2
(45) Date of Patent: Sep. 19, 2017

(54) METHOD AND APPARATUS FOR PRESENTING MULTI-DIMENSIONAL REPRESENTATIONS OF AN IMAGE DEPENDENT UPON THE SHAPE OF A DISPLAY

(75) Inventors: Juha Henrik Arrasvuori, Tampere (FI); Peter Eskolin, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 116 days.

(21) Appl. No.: 13/404,098

(22) Filed: Feb. 24, 2012

(65) Prior Publication Data

US 2013/0222222 A1   Aug. 29, 2013

(51) Int. Cl.
*G06T 19/00* (2011.01)
(52) U.S. Cl.
CPC ......... *G06T 19/00* (2013.01); *G09G 2380/02* (2013.01)
(58) Field of Classification Search
USPC .......................................... 345/156, 173–179
See application file for complete search history.

(56) References Cited

U.S. PATENT DOCUMENTS

| | | | |
|---|---|---|---|
| 8,543,166 | B2 | 9/2013 | Choi et al. |
| 8,638,311 | B2 | 1/2014 | Kang |
| 8,922,531 | B2 | 12/2014 | Lee |
| 9,489,913 | B2 | 11/2016 | Kwak et al. |
| 2003/0098857 | A1 | 5/2003 | Gettemy et al. |
| 2004/0008191 | A1 | 1/2004 | Poupyrev et al. |

(Continued)

FOREIGN PATENT DOCUMENTS

| | | |
|---|---|---|
| EP | 0 965 970 A1 | 12/1999 |
| EP | 2 151 978 A1 | 2/2010 |

(Continued)

OTHER PUBLICATIONS

Nokia Kinetic Device Offers a New Twist on Smartphone Interaction (hands-on Video) Publication Date: Oct. 27, 2011 [online][retrieved Dec. 30, 2011]. Retrieved from the Internet: <URL: http://www.theverge.com/2011/10/27/2518958/nokia-kinetic-device-offers-a-new-twist-on-smartphone-interaction> 12 pages.

(Continued)

*Primary Examiner* — Alexander Eisen
*Assistant Examiner* — Cory Almeida
(74) *Attorney, Agent, or Firm* — Alston & Bird LLP

(57) ABSTRACT

A method, apparatus and computer program product are provided to cause different multi-dimensional representations of an image to be presented upon a display and to facilitate changing from one multi-dimensional representation of the image to another multi-dimensional representation of the image, such as in response to a change in the shape of the display. In the context of a method, a first, multi-dimensional representation of an image is caused to be presented upon the display while the display has a first shape. The method also causes a second, multi-dimensional representation of the image, different than the first, multi-dimensional representation of the image, to be presented upon the display while the display has a second shape, different than the first shape. The method also determines the shape of the display such that the corresponding representation of the image is caused to be presented in response thereto.

26 Claims, 11 Drawing Sheets

(56) References Cited

U.S. PATENT DOCUMENTS

| | | | |
|---|---|---|---|
| 2004/0212588 A1* | 10/2004 | Moriyama | 345/156 |
| 2005/0140646 A1 | 6/2005 | Nozawa | |
| 2006/0238494 A1 | 10/2006 | Narayanaswami et al. | |
| 2006/0274036 A1 | 12/2006 | Hioki et al. | |
| 2007/0009222 A1 | 1/2007 | Koo et al. | |
| 2007/0132726 A1 | 6/2007 | Moriyama | |
| 2007/0205997 A1 | 9/2007 | Lieshout et al. | |
| 2007/0247422 A1* | 10/2007 | Vertegaal et al. | 345/156 |
| 2008/0204420 A1 | 8/2008 | Dunnigan et al. | |
| 2009/0085866 A1 | 4/2009 | Sugahara | |
| 2010/0011291 A1 | 1/2010 | Nurmi | |
| 2010/0056223 A1* | 3/2010 | Choi et al. | 455/566 |
| 2010/0097338 A1 | 4/2010 | Miyashita et al. | |
| 2010/0117975 A1 | 5/2010 | Cho | |
| 2010/0128112 A1 | 5/2010 | Marti et al. | |
| 2010/0141605 A1 | 6/2010 | Kang et al. | |
| 2010/0164888 A1 | 7/2010 | Okumura et al. | |
| 2011/0009169 A1 | 1/2011 | Kim | |
| 2011/0227822 A1 | 9/2011 | Shai | |
| 2012/0115422 A1* | 5/2012 | Tziortzis et al. | 455/73 |
| 2012/0235893 A1 | 9/2012 | Phillips et al. | |
| 2012/0268665 A1 | 10/2012 | Yetukuri et al. | |
| 2013/0050269 A1 | 2/2013 | Arrasvuori | |
| 2013/0093660 A1 | 4/2013 | Hirsch et al. | |
| 2013/0162534 A1 | 6/2013 | Chen et al. | |
| 2013/0201093 A1 | 8/2013 | Kim et al. | |
| 2014/0002402 A1 | 1/2014 | Kang et al. | |
| 2014/0078047 A1 | 3/2014 | Seo et al. | |
| 2014/0310636 A1 | 10/2014 | Arrasvuori et al. | |

FOREIGN PATENT DOCUMENTS

| | | |
|---|---|---|
| KR | 2011-0080573 A | 7/2011 |
| WO | WO 2010/004080 A1 | 1/2010 |
| WO | WO 2010/038157 A2 | 4/2010 |
| WO | WO 2011/005318 A2 | 1/2011 |
| WO | WO-2013/068791 A1 | 5/2013 |

OTHER PUBLICATIONS

Office Action for U.S. Appl. No. 13/404,102 dated Sep. 16, 2013.
International Search Report and Written Opinion for Application No. PCT/IB2013/051419 dated Jul. 5, 2013.
Office Action for U.S. Appl. No. 13/404,102; dated Feb. 10, 2014.
International Search Report and Written Opinion for Application No. PCT/FI2013/050181 dated Nov. 8, 2013.
Lee, S. et al., *How Users Manipulate Deformable Displays as Input Devices*, CHI 2010: Devising Input (Apr. 10-15, 2010) 1647-1656.
Schwesig, C. et al., *Gummi: A Bendable Computer*, CHI 2004, vol. 6, No. 1 (Apr. 24-29, 2004), 263-270.
Adistarone: *3D Building Features on Goggle Maps Mobile App With 2 Fingers Tilt, Rotate, Zoom*, Youtube [online] [retrieved Nov. 1, 2013]. Retrieved from the Internet: <URL: https://www.youtube.com/watch?v=1qkKK1Xt8W0>. (Jul. 21, 2011) 1 page.
Office Action for corresponding Chinese Application No. 201380019560.5 dated Apr. 5, 2016.
Office Action for U.S. Appl. No. 13/404,102 dated Oct. 16, 2015.
Office Action from corresponding Korean Patent Application No. 2014-7026597, dated Sep. 17, 2015.
Office Action for European Application No. 13 718 892.6 dated Jan. 26, 2016.
Office Action for U.S. Appl. No. 13/404,102 dated Jun. 10, 2016.
Office Action from corresponding Korean Patent Application No. 2014-7026597 dated Aug. 23, 2016.
Office Action from corresponding European Patent Application No. 13709957.8 dated Aug. 3, 2016.
Office Action from corresponding Chinese Patent Application No. 201380019560.5 dated Dec. 16, 2016.
Office Action for U.S. Appl. No. 13/404,102 dated Apr. 30, 2015.
Office Action from U.S. Appl. No. 13/404,102, dated Jun. 16, 2014.
Office Action for U.S. Appl. No. 13/404,102 dated Nov. 18, 2016.
Herkenrath, Gero et al.; "TWEND: Twisting and Bending as New Interaction Gesture in Mobile Device"; *CHI EA 2008 Extended Abstracts on Human Factors in Computing Systems*; pp. 3819-3824; Apr. 5-10, 2008.
Lahey, Byron et al.; "PaperPhone: Understanding the Use of Bend Gestures in Mobile Devices with Flexible Electronic Paper Displays"; *CHI 2011, Session: Flexible Grips & Gestures*; pp. 1303-1312; May 7-12, 2011.
Office Action from U.S. Appl. No. 13/404,102 dated Nov. 25, 2014.
Office Action for Chinese Application No. 20138001195605 dated May 10, 2017.
Notice of Allowance for U.S. Appl. No. 13/404,102 dated Jun. 27, 2017.

* cited by examiner

METHOD AND APPARATUS FOR PRESENTING MULTI-DIMENSIONAL REPRESENTATIONS OF AN IMAGE DEPENDENT UPON THE SHAPE OF A DISPLAY

TECHNOLOGICAL FIELD

An example embodiment of the present invention relates generally to the presentation of an image upon a display and, more particularly, to the presentation of multi-dimensional images upon the display.

BACKGROUND

Computing devices, such as laptop computers, tablet computers, mobile telephones, personal digital assistants (PDAs) or the like, may present a wide variety of images upon a display. The images may include, for example, maps, photographs, textual documents, web pages or the like. Many computing devices have displays that are configured to present a two-dimensional representation of the image, such as a two-dimensional representation of a map that is presented upon a planar display. However, some computing devices include displays that are configured to present three-dimensional representations of an image, such as a three-dimensional representation of a photograph, a video or the like.

Both two-dimensional and three-dimensional representations of an image may offer certain advantages and disadvantages. For example, a two-dimensional representation of an image may provide a relatively simple representation of the image that can be readily comprehended by a user. In contrast, a three-dimensional representation of an image may be more complex, but may present a more realistic image and/or may provide additional information that the user may find helpful in reviewing the image. As such, a user may find it desirable to view different representations of the same image at different times and/or for different purposes.

BRIEF SUMMARY

A method, apparatus and computer program product are provided according to an example embodiment in order to cause different multi-dimensional representations of an image to be presented upon a display and to facilitate changing from one multi-dimensional representation of the image to another multi-dimensional representation of the image. In one embodiment, the display may be configured to be transformed so as to have different shapes such that a change in the shape of the display may cause the multi-dimensional representation of the image that is presented upon the display to be correspondingly changed. Thus, by changing the shape of the display, such as by bending the display, a user may intuitively change the multi-dimensional representation of the image that is presented upon the display.

In one embodiment, a method is provided that includes causing a first, multi-dimensional representation of an image to be presented upon a display in an instance in which a display has a first shape. The method of this embodiment also causes a second, multi-dimensional representation of the image to be presented upon the display in an instance in which the display has a second shape, different than the first shape. In this regard, the second, multi-dimensional representation of the image is different than the first, multi-dimensional representation of the image. The method of this embodiment also determines the shape of the display such that the corresponding representation of the image is caused to be presented in response thereto.

In another embodiment, an apparatus is provided that includes at least one processor and at least one memory including computer program code with the at least one memory and the computer program code configured to, with the at least one processor, cause the apparatus at least to cause a first, multi-dimensional representation of the image to be presented on the display in an instance in which the display has a first shape. The at least one memory and the computer program code are also configured to, with the at least one processor, cause the apparatus to cause a second, multi-dimensional representation of the image to be presented upon the display in an instance in which the display has a second shape, different than the first shape. In this regard, the second, multi-dimensional representation is different than the first multi-dimensional representation. The at least one memory and the computer program code of this embodiment are also configured to, with the at least one processor, cause the apparatus to determine the shape of the display such that the corresponding representation of the image is caused to be presented in response thereto.

In a further embodiment, a computer program product is provided that includes at least one computer-readable storage medium having computer-executable program code portions stored therein. The computer-executable program code portions include program instructions configured to cause a first, multi-dimensional representation of an image to be presented upon a display in an instance in which the display has a first shape. The computer-executable program code portions also include program instructions configured to cause a second, multi-dimensional representation of the image to be presented upon the display in an instance in which the display has a second shape, different than the first shape. In this regard, the second, multi-dimensional representation is different than the first, multi-dimensional representation. The computer-executable program code portions of this embodiment also include program instructions configured to determine the shape of the display such that a corresponding representation of the image is caused to be presented in response thereto.

In yet another embodiment, an apparatus is provided that includes means for causing a first, multi-dimensional representation of an image to be presented upon a display in an instance in which the display has a first shape. The apparatus of this embodiment also includes means for causing a second, multi-dimensional representation of the image to be presented upon the display in an instance in which the display has a second shape, different than the first shape. In this regard, the second, multi-dimensional representation is different than the first multi-dimensional representation. The apparatus of this embodiment also includes means for determining the shape of the display such that a corresponding representation of the image is caused to be presented in response thereto.

In other embodiments of the method, apparatus and computer program product, the display may define a z-axis extending perpendicular to the display in a planar configuration. Additionally, the determination of the shape of the display may include the determination of the degree to which the display is bent. As such, the second, multi-dimensional representation of the image may be caused to be presented by causing the image to be represented along the z-axis in a manner that corresponds to the degree to which the display is bent. The display of one embodiment may define a concave space in a bent configuration. In this embodiment, a gesture that is performed within the concave space may be received and an action may be caused to be taken in response to the gesture.

In one embodiment, the first, multi-dimensional representation of the image may be a two-dimensional representation of the image that is caused to be presented in an instance in which the display has a planar configuration. Additionally, the second multi-dimensional representation of the image may be a three-dimensional representation of the image that is caused to be presented in an instance in which the display has a bent configuration. In another embodiment, the first and second multi-dimensional representations of the image may both be three-dimensional representations of the image that are caused to be presented in an instance in which the display has first and second bent configurations, respectively. In this embodiment, the first and second three-dimensional representations of the image are different from one another and correspond to the first and second bent configurations, respectively, that are also different from one another. The first and second bent configurations may define, for example, concave and convex configurations.

BRIEF DESCRIPTION OF THE DRAWINGS

Figure 1:
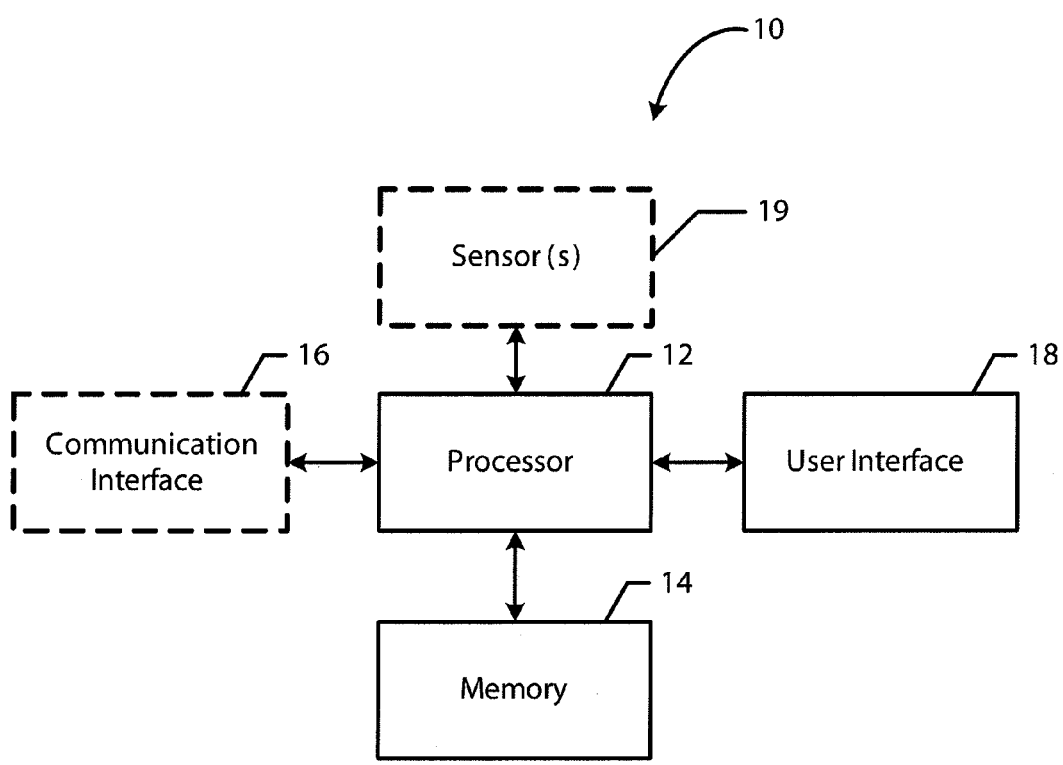
Figure 2:
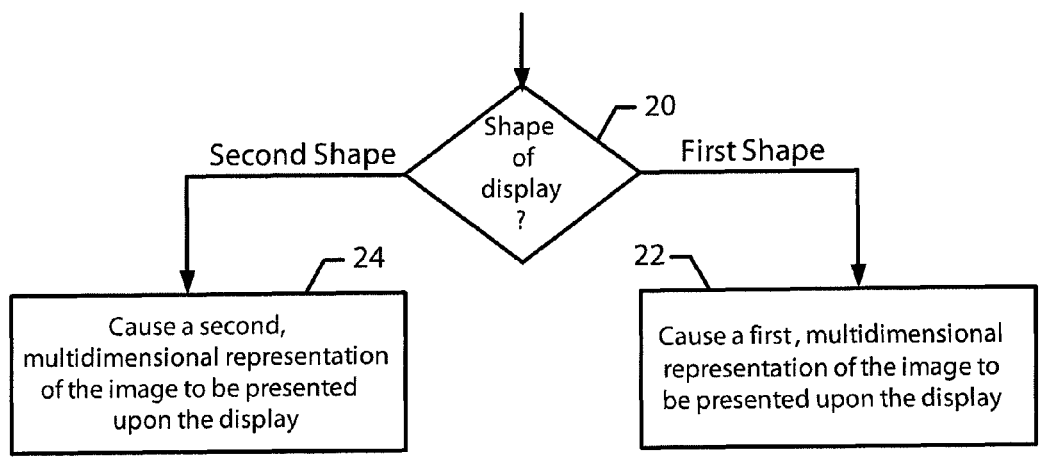
Figure 3:
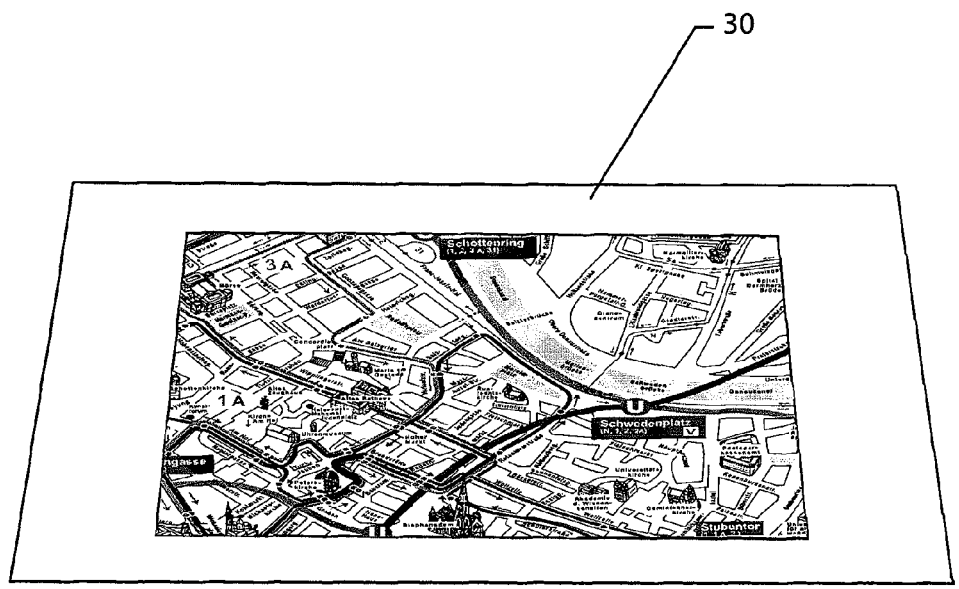
Figure 4:
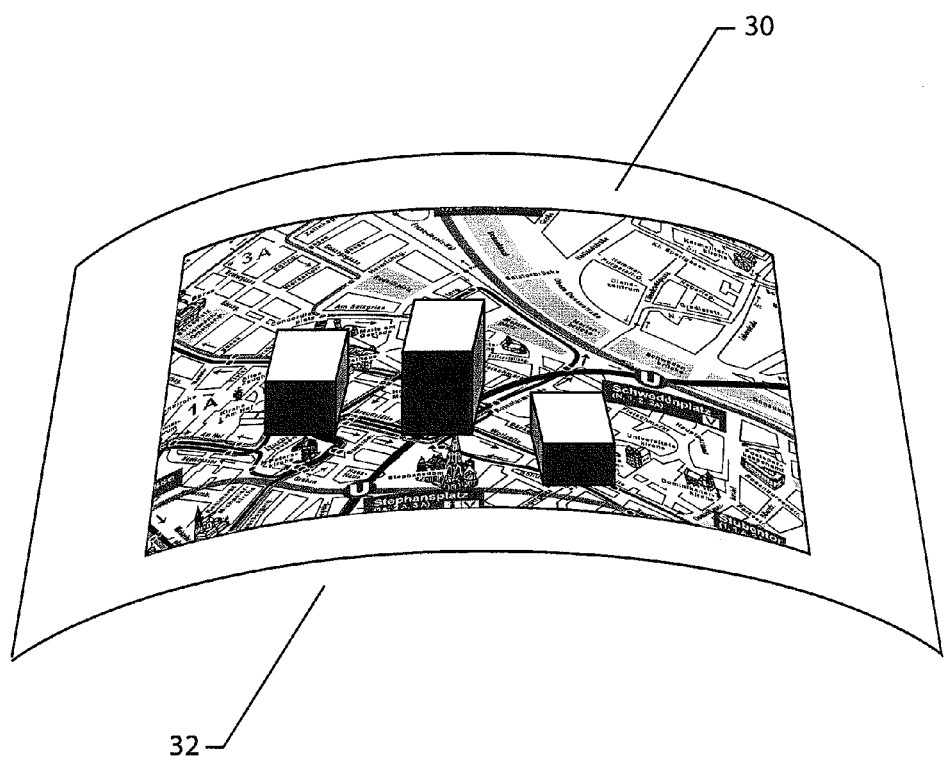
Figure 5:
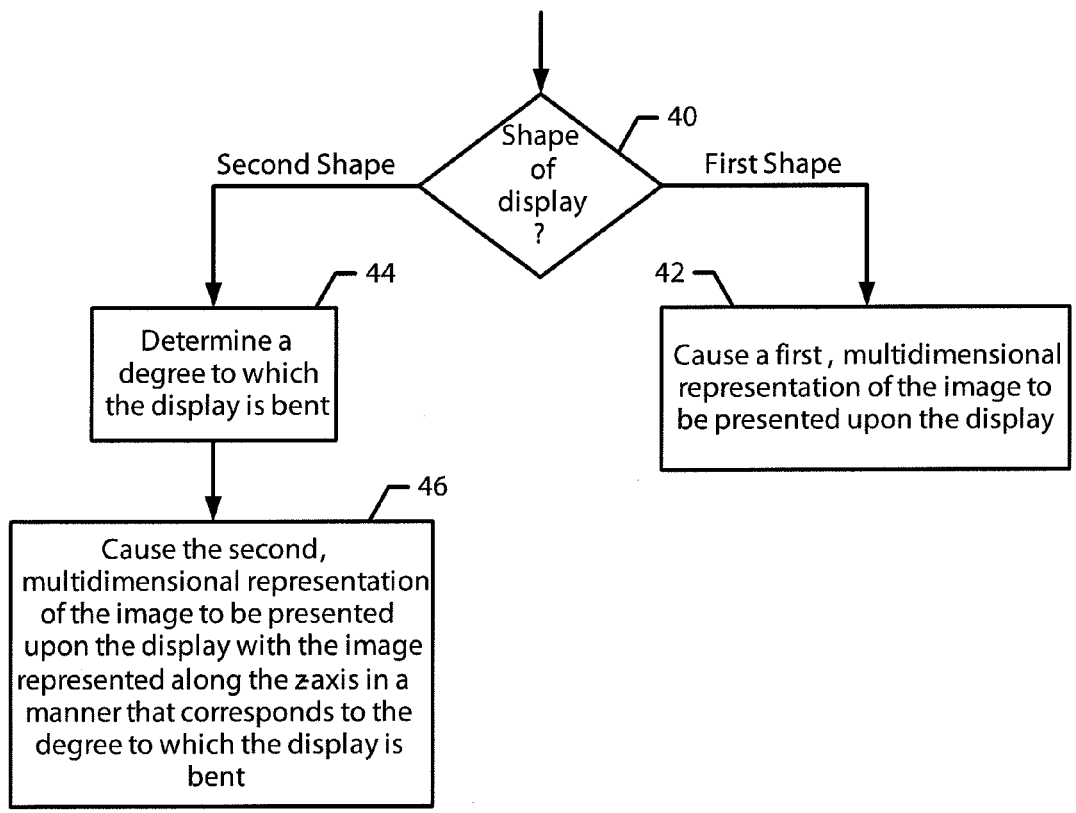
Figure 6:
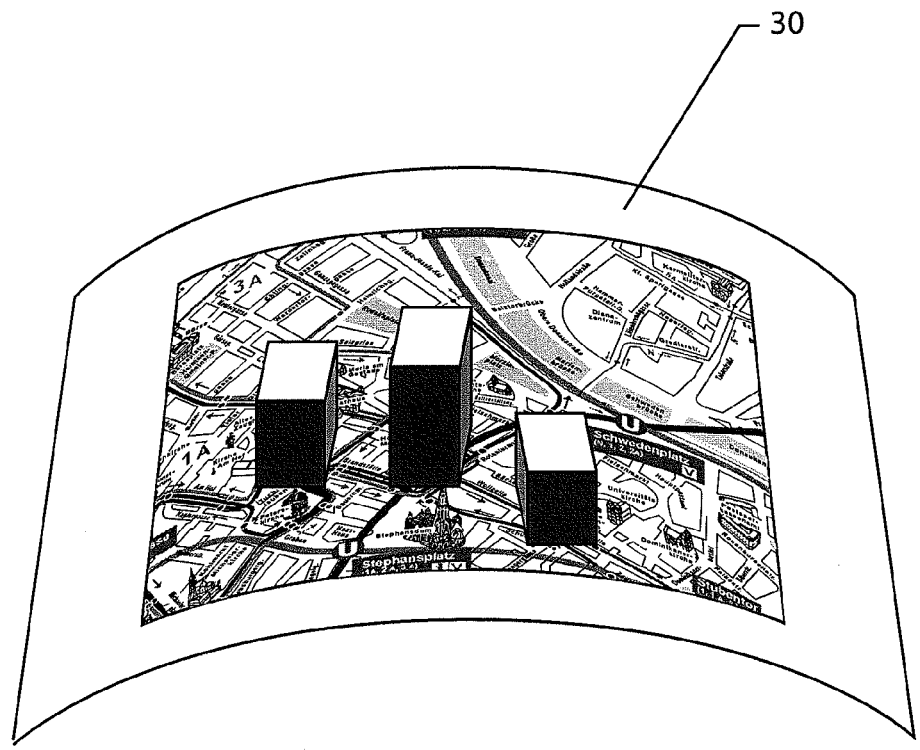
Figure 7:
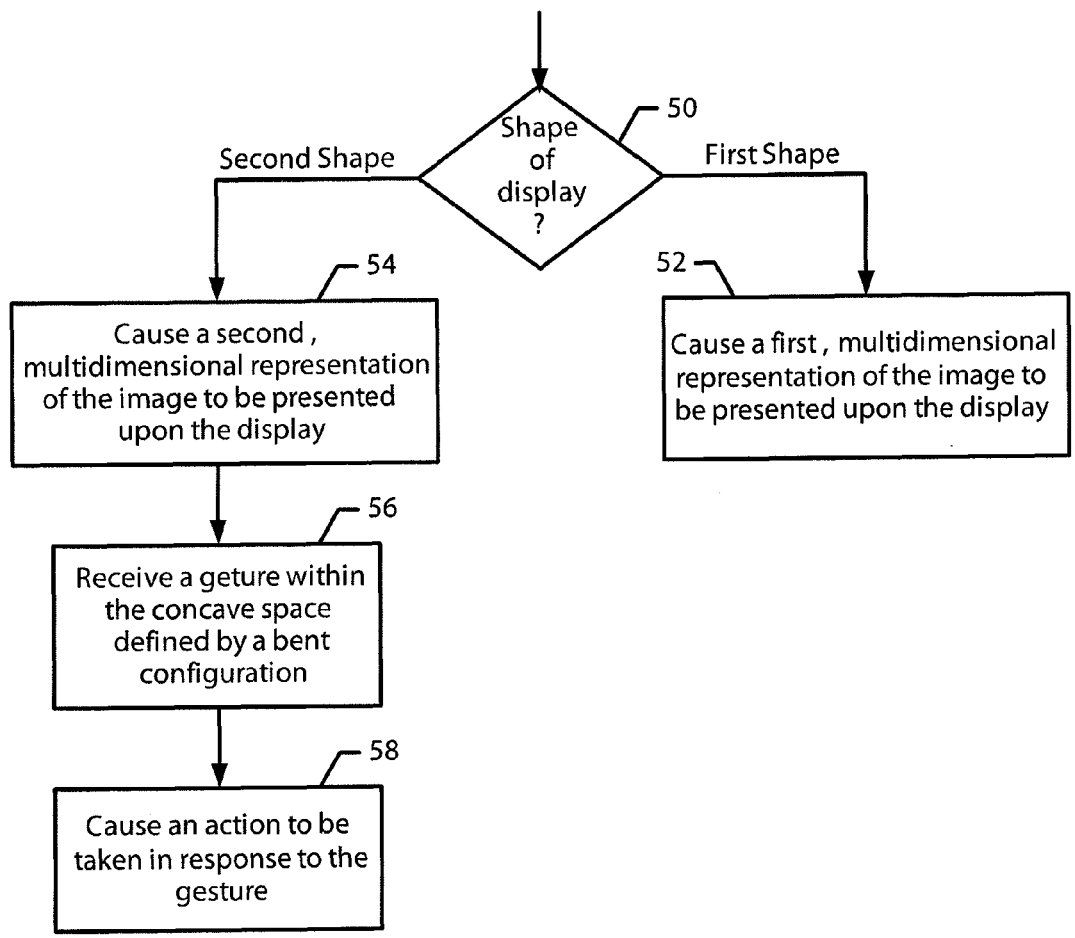
Figure 8:
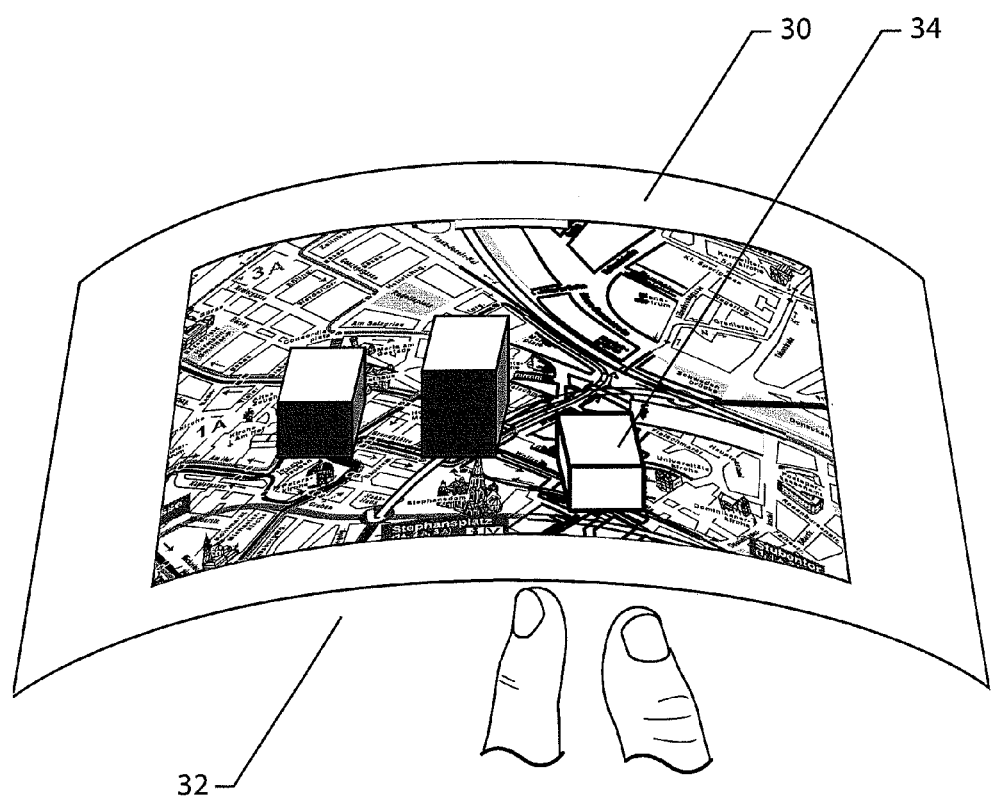
Figure 9:
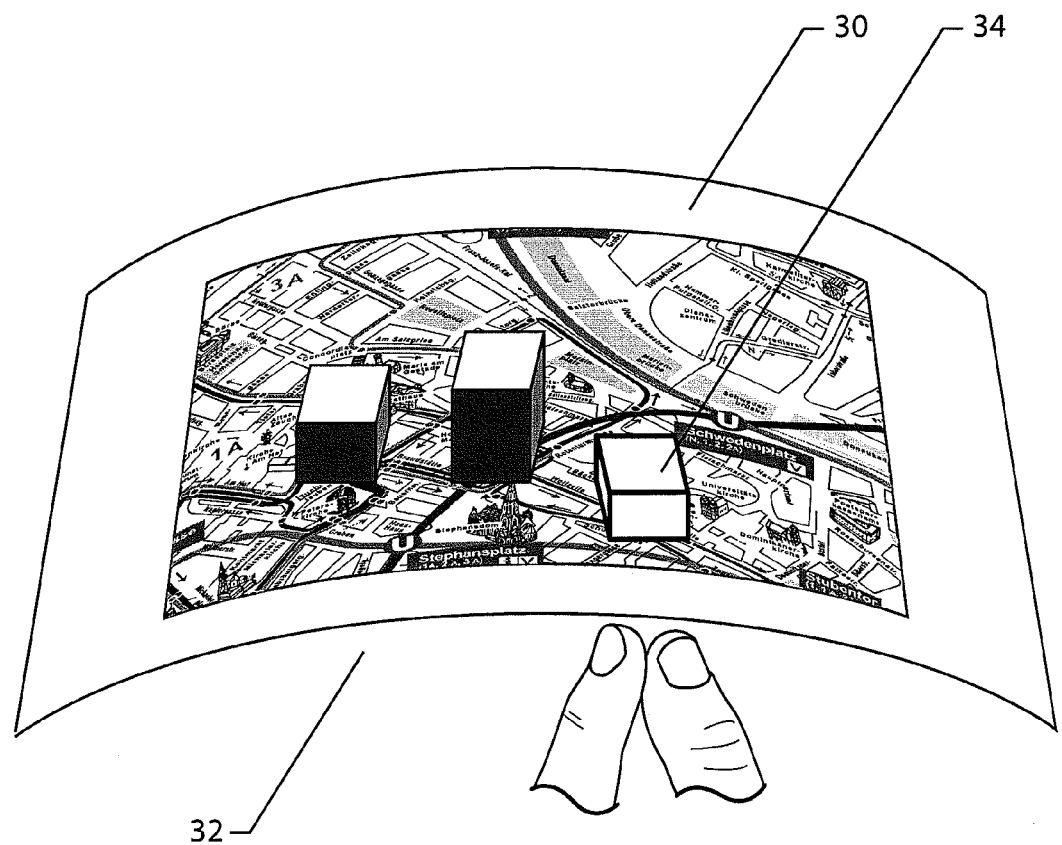
Figure 10:
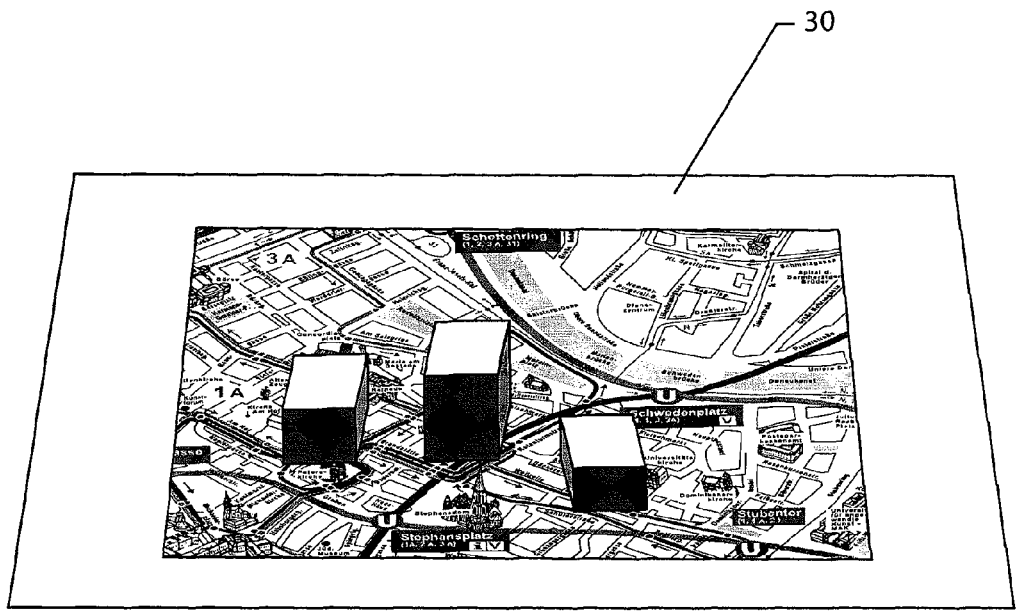
Figure 11:
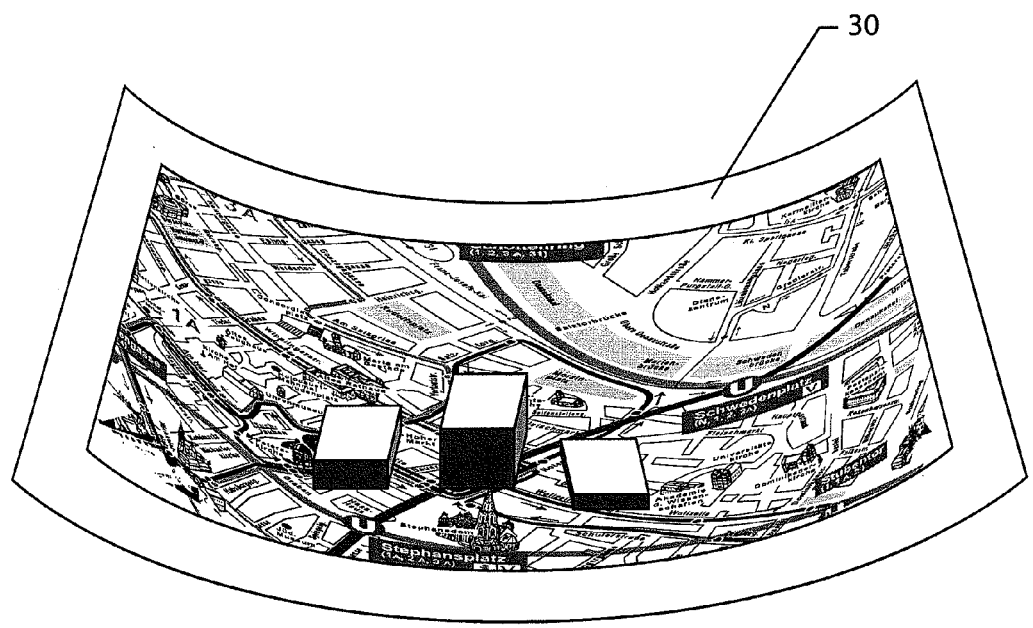

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a flow chart illustrating operations performed in accordance with an example embodiment of the present invention;

FIG. 3 illustrates a display presenting a two-dimensional representation of an image while in a planar configuration;

FIG. 4 illustrates s display presenting a three-dimensional representation of an image while in a bent configuration in accordance with an example embodiment of the present invention;

FIG. 5 is a flow chart illustrating the operations performed in accordance with another embodiment of the present invention;

FIG. 6 illustrates a display presenting a three-dimensional representation of an image while in a configuration that is bent to a greater degree than the display of FIG. 4 in accordance with an example embodiment of the present invention;

FIG. 7 is a flow chart illustrating the operations performed in accordance with yet another embodiment of the present invention;

FIG. 8 illustrates a display in a bent configuration in which a gesture is performed within the concave space defined by the bent configuration in accordance with an example embodiment of the present invention;

FIG. 9 illustrates the display of FIG. 8 in which the gesture that is performed within the concave space selects an item within the image in accordance with an example embodiment of the present invention;

FIG. 10 illustrates a display presenting the same three-dimensional representation of the image as shown in FIG. 4 while in a planar configuration in accordance with an example embodiment of the present invention; and FIG. 11 illustrates a display presenting a different three-dimensional representation of the image while having a different bent configuration in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product are provided according to example embodiments of the present invention in order to cause different multi-dimensional representations of an image to be presented upon a display. In this regard, the method, apparatus and computer program product of an example embodiment may determine the shape of the display and may, in turn, cause a corresponding multi-dimensional representation of the image to be presented upon the display based upon the shape of the display. Thus, a display may cause a first, multi-dimensional representation of an image to be presented upon the display while having a first shape, but may cause a second, multi-dimensional representation of the image to be presented on the display while having a second shape. Thus, a user may alter the multi-dimensional representation of the image by correspondingly changing the shape of the display, such as by bending the display, thereby providing an intuitive mechanism for switching between different multi-dimensional representations of an image.

Referring now to FIG. 1, an apparatus 10 that may be specifically configured to perform the operations described below in conjunction with an example embodiment of the present invention is illustrated. The apparatus may be embodied by any of a wide variety of computing devices including computing devices having integral displays, such as computers, e.g., laptop computers, tablet computers or the like, and mobile terminals, such as PDAs, pagers, mobile televisions, mobile telephones, gaming devices, cameras, camera phones, video recorders, audio/video players, radios, global positioning system (GPS) devices, navigation devices, or any combination of the aforementioned, and other types of voice and text communications systems. While shown in FIG. 1 and described below to have an integral display, the apparatus of one embodiment need not include an integral display, but may, instead, be in communication with a remote display such that the apparatus of this embodiment may be embodied by other types of computing devices, such as servers, personal computers, work stations or the like.

Regardless of the manner in which the apparatus 10 is embodied, the apparatus may generally be configured as shown, for example, in FIG. 1. In this embodiment, the apparatus may include or otherwise be in communication with a processor 12, a memory device 14 and a user interface 18. As described below, the apparatus may also optionally include a communication interface 16 and/or one or more sensors 19, as represented by the dashed lines in FIG. 1. In some embodiments, the processor (and/or co-processors or any other processing circuitry assisting or otherwise associated with the processor) may be in communication with the memory via a bus for passing information among components of the apparatus. The memory may include, for example, one or more non-transitory volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory may be configured to store information, data, applications, instructions or the like for enabling the apparatus to carry out various functions in accordance with an example embodiment of the present invention. For example, the memory could be configured to buffer input data for processing by the processor. Additionally or alternatively, the memory could be configured to store instructions for execution by the processor.

The apparatus 10 may, in some embodiments, be a computing device configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

The user interface 18 may be in communication with the processor 12 to receive an indication of a user input at the user interface and/or to provide information, such as an audible, visual, mechanical or other output, to the user. As such, the user interface may include, for example, a display, e.g., a touch screen, which may be integral with the remainder of the apparatus 10 or may be remote therefrom and in communication therewith, as noted above. In instances in which the display has a planar configuration, the display may define an x-y plane along the surface of the display as well as a z-axis extending perpendicular to the display. The user interface may also include other input/output mechanisms and, as such, may optionally include, among other devices or elements, any or all of a speaker, a microphone, a keyboard or the like. In this regard, for example, the processor may comprise user interface circuitry configured to control at least some functions of one or more elements of the user interface, such as, for example, the display. The processor and/or user interface circuitry comprising the processor may be configured to control one or more functions of one or more elements of the user interface through computer program instructions (e.g., software and/or firmware) stored by a memory accessible to the processor (e.g., memory 14 and/or the like).

While the apparatus 10 need not be configured to communicate with other devices and, as such, need not include a communication interface, the apparatus of some embodiments is configured to communicate with other devices and, as such, may include a communication interface 16. In these embodiments, the communications interface may be any means such as a device or circuitry embodied in either hardware, software, or a combination of hardware and software that is configured to receive and/or transmit data from/to the devices that are interacting. In this regard, the communication interface may include, for example, an antenna (or multiple antennas) and supporting hardware and/or software for enabling communications with a wireless communication network. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As also shown in FIG. 1, the apparatus 10 may optionally include one or more sensors 19 for determining the configuration of the display or for at least providing information from which the configuration and, in turn, the shape of the display may be determined. In one embodiment, for example, the apparatus may include one or more sensors that are carried by and/or move in concert with the display such that an output of the sensor(s) is indicative of the configuration of the display. Various types of sensors may be employed including, for example, position sensors, displacement sensors, strain gauge or strain gage sensors, piezoelectric bending sensors, conductive ink-based sensors, conductive fabric-based sensors, optical bending sensors, fiber optic sensors, capacitive bending sensors, micro electro mechanical bending sensors, flex sensors (e.g., sandwich-type bidirectional bending sensors) or the like. Depending on the type of sensor, the sensors may provide variety of information. With respect to a strain gauge sensor, the sensor provides information relating to the deformation of an object that is being monitored since the resistance of the strain gauge changes as the object that is monitored is deformed. With respect to a piezoelectric bending sensor, the sensor also provides information regarding the deformation of an object being monitored since the sensor includes polarized material that creates a voltage when deformed. With respect to conductive ink-based sensors, e.g. a plastic film printed with a special carbon ink, the sensor may provide information regarding the bending of an object being monitored since the resistance of the sensor increases when the object is bent, although the direction of the bending may not be determinable with this type of sensor. With respect to a conductive fabric-based sensor, the sensor also provides information regarding the bending of an object being monitored since the resistance of the sensor changes in response to bending. With respect to an optical bending sensor, such as a fiber optic sensor, and a capacitive bending sensor, the sensor may also provide information about deformation or bending of an object that is being monitored as a result of a detectable change in the optical transmission behavior of an optical bending sensor or a change in capacitance of a capacitive bending sensor.

Referring now to FIG. 2, the operations performed, such as by apparatus 10, in accordance with an example embodiment of the present invention are illustrated. As shown in block 20 of FIG. 2, the apparatus may include means, such as the processor 12, sensor(s) 19 or the like, for determining the shape of the display. The shape of the display may be determined in various manners. By way of example, the sensor(s) may be configured to detect the configuration of the display, such as by detecting whether the display has a planer configuration or a bent configuration. In regards to the detection of a bent configuration of the display, the sensor(s) may be configured to detect the degree to which the display is bent, such as the radius of curvature of the display. Additionally or alternatively, in instances in which the display has a bent configuration, the sensor(s) may be configured to determine the direction in which the display is bent, such as by being bent in a concave configuration or a convex configuration from the viewpoint of the user.

The processor 12 may therefore be configured to receive signals from the sensor(s) 19 that provide information regarding the configuration of the display such that the processor may, in turn, determine the shape of the display. For example, the processor may determine that the display has a planer configuration or a bent configuration. Additionally, in instance in which the display has a bent configuration, the processor may determine the shape of the display by also taking into account the degree to which the display is bent and/or the direction in which the display is bent.

As shown in block 22 of FIG. 2, the apparatus 10 may include means, such as the processor 12, the user interface 18 or the like, for causing a first, multi-dimensional representation of the image to be presented upon the display in an instance in which the display has a first shape. Additionally, the apparatus may include means, such as the processor, the user interface or the like, for causing a second multi-dimensional representation of the image to be presented upon the display in an instance in which the display has a second shape, different than the first shape. See block 24.

The apparatus 10 may be configured to cause a variety of different types of images to be presented upon the display, such as a map as illustrated and described here, or other types of images. Even though the same image may be presented while the display has either the first shape or the second shape, the multi-dimensional representation of the image is different depending upon the shape of the display. For example, the dimensionality of the representation of the image may be different depending upon the shape of the display, such as with a two-dimensional representation of the image being presented upon the display in an instance in which the display has the first shape, and a three-dimensional representation of the image when presented upon the display in an instance in which the display has the second shape. Alternatively, the first and second multi-dimensional representations of the image may each have the same dimensionality, such as by each being three-dimensional representations, but the three-dimensional representations of the image may still be different depending upon the shape of the display, as described below.

By way of example, the display of one embodiment may have a first shape in which the display has a planer configuration. In this embodiment as shown in FIG. 3, a two-dimensional representation of the image, such as a map, may be presented upon the display 30 while the display has the planer configuration. In response to the reconfiguration of the display so as to have a different shape, such as a bent configuration as shown in FIG. 4, a three-dimensional representation of the image may be presented upon the display. As shown in FIG. 4, the three-dimensional representation of the image may still provide an image of the map, but one or more elements of the image, such as one or more of the buildings, may be depicted in three dimensions so as to provide a visual indication of the relative height of the buildings.

As shown in FIG. 5, the operations performed by an apparatus 10 specifically configured in accordance with another embodiment of the present invention are illustrated. As shown in block 40, the apparatus may include means, such the processor 12, one or more sensors 19 or the like, for determining the shape of the display such as described above in conjunction with block 20 of FIG. 2. In an instance in which the display is determined to have a first shape, a first multi-dimensional representation of the image may be presented upon the display, such as described above in conjunction with block 22 of FIG. 2. See block 42. However, in an instance in which the display is determined to have a second shape, such as a bent configuration, the apparatus may include means, such as the processor, one or more sensors or the like, for determining the degree to which the display is bent. See block 44. In this regard, the display 30 may be bent to lesser or greater degrees as shown, for example, in FIGS. 4 and 6, respectively. Based upon the degree to which the display is bent, the resulting multi-dimensional representation of the image may be different. As such, the apparatus may include means such as a processor, the user interface 18 or the like, for causing a second, multi-dimensional representation of the image to be presented upon the display with the image represented along the z-axis in a manner that corresponds to the degree to which the display is bent. See block 46 of FIG. 5.

By way of example, the images presented by the displays 30 of FIGS. 4 and 6 are each three-dimensional representations of the same image. However, the three-dimensional representation of the buildings extend further along the z-axis in the embodiment of FIG. 6 than in the embodiment of FIG. 4 as a result of the increased bending of the display of FIG. 6 relative to the display of FIG. 4. Although the extent to which the image is represented along the z-axis is shown to directly correspond to the degree to which the display is bent by comparison of the embodiments of FIGS. 4 and 6, the image may be caused to extend along the z-axis in a manner that corresponds in other ways to the degree to which the display is bent in other embodiments. By causing the image to be extended along the z-axis in a manner that corresponds to the degree to which the display is bent, however, the method, apparatus and computer program product of one embodiment provide an intuitive mechanism by which to modify the multi-dimensional representation of the image by bending of the display.

The display 30 in a bent configuration defines a concave space 32 as shown, for example, in FIGS. 4 and 6. The concave space may provide a well-defined region within which gestures may be made by user and received by the apparatus 10 so as to cause various actions to be taken by the apparatus. With respect to FIG. 7, for example, the operations performed by an apparatus that is specifically configured in accordance with another embodiment of the present invention are illustrated. As shown in block 50, the apparatus may include means, such the processor 12, one or more sensors 19 or the like, for determining the shape of the display such as described above in conjunction with block 20 of FIG. 2. In an instance in which the display is determined to have a first shape, a first multi-dimensional representation of the image may be presented upon the display, such as described above in conjunction with block 22 of FIG. 2. See block 52. However, in an instance in which the display is determined to have a second shape, a second multi-dimensional representation of the image may be presented upon the display, such as described above in conjunction with block 24 of FIG. 2. See block 54.

In this embodiment, the apparatus 10 may also include means, such as the processor 12, the user interface 18 or the like, for receiving a gesture within the concave space 32 defined by the bent configuration of the display 30. For example, FIG. 8 illustrates two fingers being placed within the concave space with the fingers being spaced slightly apart from one another. The apparatus of this embodiment may also include means, such as the processor or the like, for causing an action to be taken in response to the gesture. Various gestures may be defined and various actions may be performed in response to respective one of the gestures. With respect to the embodiment of FIG. 8 in which the user has placed two fingers within the concave shape with the fingers being spaced slightly apart, the fingers may define a gap, such as between the fingertips, that is aligned with a region of the image in which elements 34 are to be highlighted. By way of another example and with reference to FIG. 9, the user may make another, related gesture by bringing their fingertips together in a pinching gesture within the concave space. This pinching gesture may cause the apparatus, such as the processor, to select the element 34 of the image that is aligned with the location at which the fingers are pinched together. By receiving gestures within the concave space, the method, apparatus and computer program product of this embodiment provide for a well-defined region within which gestures may be made so as to facilitate user interaction with the apparatus and, more particularly, with the image presented upon the display.

The method, apparatus and computer program product of one embodiment may be configured to repeatedly determine the shape of the display and to cause the multi-dimensional representation of the image that is presented upon the display to change in correspondence to the shape of the display in response to each change in the shape of the display. However, the method, apparatus and computer program product of another embodiment need not cause the multi-dimensional representation of the image that is presented upon the display to change in response to every change in the shape of the display.

For example, the method, apparatus and computer program product of one embodiment may be configured such that once the display is bent so as to have a bent configuration, the bent configuration may be correlated with and can cause a multi-dimensional representation of the image, e.g., a three-dimensional representation of the image, to be presented upon the display. After establishment of the multi-dimensional representation of the image in response to the bent configuration, the shape of the display may be changed in accordance with one embodiment without correspondingly changing the multi-dimensional representation of the image that is presented upon the display. For example, the display 30 may be returned to a planer configuration as shown in FIG. 10 while continuing to display the multi-dimensional representation of the image such as the three-dimensional representation of the image established by the prior bent configuration of the display.

The method, apparatus computer program product of this embodiment may require a triggering event in order to permit the multi-dimensional representation of the image that is presented in response to the prior bent configuration of the display to be changed such that a different multi-dimensional representation of the image is presented in correspondence to a different shape that has been assumed by the display. Various types of triggering events may be defined, including user actuation of the various hard and/or soft keys. In one embodiment, however, the triggering event may be the bending of the display in the opposite direction from that of the prior bent configuration. For example, in an instance in which the prior bent configuration that established the multi-dimensional representation of the image that is presented upon the display 30 is a convex shape from the viewpoint of the user as shown in FIG. 4, the apparatus 10 may include means, such as the processor 12, one or more sensors 19 or the like, for detecting a change in the shape of the display in which the display is bent in the opposite direction so as to assume, for example, a concave shape from the viewpoint of the user, such as shown in FIG. 11.

In this instance, the multi-dimensional representation of the image that is presented upon the display 30 may be changed in a correspondence with the current bent configuration of the display. In regards to the embodiment of FIG. 11, for example, the extent to which elements of the image are extended along the z-axis is less in an instance in which the display is bent so as to have a concave configuration as shown in FIG. 11 as opposed to an instance in which the display is bent so to have a convex configuration as shown in FIG. 4. The method, apparatus computer program product of this example embodiment may therefore provide an intuitive mechanism by which the user may adjust the extent to which elements within an image are extended along the z-axis of the display with those elements being extended to a greater degree in an instance in which the display is flexed towards the user and to a lesser degree in an instance in which the display is flexed away from the user.

FIGS. 2, 5 and 7 are flowcharts of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 14 of an apparatus 10 and executed by a processor 12 of the apparatus. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart blocks. These computer program instructions may also be stored in a computer-readable memory that may direct a computer or other programmable apparatus to function in a particular manner, such that the instructions stored in the computer-readable memory produce an article of manufacture which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   causing a first, multi-dimensional representation of an image to be presented upon a display in an instance in which the display has a first shape, wherein the display defines a z-axis extending perpendicular to the display in a planar configuration;
   causing a second, multi-dimensional representation of the image to be presented upon the display in an instance in which the display has a second shape, different than the first shape, wherein the second, multi-dimensional representation has a different dimensionality than the first, multi-dimensional representation; and
   determining a shape of the display such that a corresponding representation of the image is caused to be presented in response thereto, wherein determining the shape of the display comprises determining a degree to which the display is bent, and wherein causing the second, multi-dimensional representation of the image to be presented comprises causing the image to be represented along the z-axis in a manner that corresponds to the degree to which the display is bent such that the second, multi-dimensional representation of the image that is caused to be presented in response to a lesser degree of bending in a first direction extends along the z-axis to a different extent than the second, multi-dimensional representation of the image that is caused to be presented in response to a greater degree of bending in the first direction.

2. A method according to claim 1 wherein the display defines a concave space in a bent configuration, and wherein the method further comprises receiving a gesture performed within the concave space and causing an action to be taken in response to the gesture.

3. A method according to claim 1 wherein causing the first, multi-dimensional representation of the image to be presented comprises causing a two-dimensional representation of the image to be presented upon the display in an instance in which the display has a planar configuration, and wherein causing the second, multi-dimensional representation of the image to be presented comprises causing a three-dimensional representation of the image to be presented upon the display in an instance in which the display has a bent configuration.

4. A method according to claim 1 wherein causing the first, multi-dimensional representation of the image to be presented comprises causing a first, three-dimensional representation of the image to be presented upon the display in an instance in which the display has a first bent configuration, and wherein causing the second, multi-dimensional representation of the image to be presented comprises causing a second, three-dimensional representation of the image, different than the first, three-dimensional representation of the image, to be presented upon the display in an instance in which the display has a second bent configuration in which the display is bent in a same direction as in the first bent configuration but to a greater or lesser degree than in the first bent configuration.

5. A method according to claim 1 wherein causing the first, multi-dimensional representation of the image to be presented comprises causing a first, three-dimensional representation of the image to be presented upon the display in an instance in which the display has a first bent configuration, and wherein causing the second, multi-dimensional representation of the image to be presented comprises causing a second, three-dimensional representation of the image, different than the first, three-dimensional representation of the image, to be presented upon the display in an instance in which the display has a second bent configuration, different than the first bent configuration, and wherein the first and second bent configurations comprise concave and convex configurations.

6. A method according to claim 1 wherein determining the degree of bending comprises determining a radius of curvature of the display.

7. A method according to claim 1 further comprising causing the second, multi-dimensional representation of the image to continue to be presented upon the display in an instance in which the display is bent so as to have a shape, different than the second shape.

8. A method according to claim 7 further comprising:
detecting a triggering condition while the second, multi-dimensional representation of the image continues to be presented upon the display; and
again permitting the multi-dimensional representation of the image to assume a different shape in response to bending of the display following detection of the triggering condition.

9. An apparatus comprising at least one processor and at least one memory including computer program code, the at least one memory and the computer program code configured to, with the at least one processor, cause the apparatus at least to:
cause a first, multi-dimensional representation of an image to be presented upon a display in an instance in which the display has a first shape, wherein the display defines a z-axis extending perpendicular to the display in a planar configuration;
cause a second, multi-dimensional representation of the image to be presented upon the display in an instance in which the display has a second shape, different than the first shape, wherein the second, multi-dimensional representation has a different dimensionality than the first, multi-dimensional representation; and
determine a shape of the display such that a corresponding representation of the image is caused to be presented in response thereto,
wherein the at least one memory and the computer program code are configured to, with the at least one processor, cause the apparatus to determine the shape of the display by determining a degree to which the display is bent, and wherein the at least one memory and the computer program code are configured to, with the at least one processor, cause the apparatus to cause the second, multi-dimensional representation of the image to be presented by causing the image to be represented along the z-axis in a manner that corresponds to the degree to which the display is bent such that the second, multi-dimensional representation of the image that is caused to be presented in response to a lesser degree of bending in a first direction extends along the n-axis to a different extent than the second, multi-dimensional representation of the image that is caused to be presented in response to a greater degree of bending in the first direction.

10. An apparatus according to claim 9 wherein the display defines a concave space in a bent configuration, and wherein the at least one memory and the computer program code are further configured to, with the at least one processor, cause the apparatus to receive a gesture performed within the concave space and cause an action to be taken in response to the gesture.

11. An apparatus according to claim 9 wherein the at least one memory and the computer program code are configured to, with the at least one processor, cause the apparatus to cause the first, multi-dimensional representation of the image to be presented by causing a two-dimensional representation of the image to be presented upon the display in an instance in which the display has a planar configuration, and wherein the at least one memory and the computer program code are configured to, with the at least one processor, cause the apparatus to cause the second, multi-dimensional representation of the image to be presented by causing a three-dimensional representation of the image to be presented upon the display in an instance in which the display has a bent configuration.

12. An apparatus according to claim 9 wherein the at least one memory and the computer program code are configured to, with the at least one processor, cause the apparatus to cause the first, multi-dimensional representation of the image to be presented by causing a first, three-dimensional representation of the image to be presented upon the display in an instance in which the display has a first bent configuration, and wherein the at least one memory and the computer program code are configured to, with the at least one processor, cause the apparatus to cause the second, multi-dimensional representation of the image to be presented by causing a second, three-dimensional representation of the image, different than the first, three-dimensional representation of the image, to be presented upon the display in an instance in which the display has a second bent configuration in which the display is bent in a same direction as in the first bent configuration but to a greater or lesser degree than in the first bent configuration.

13. An apparatus according to claim 9 wherein the at least one memory and the computer program code are configured to, with the at least one processor, cause the apparatus to cause the first, multi-dimensional representation of the image to be presented by causing a first, three-dimensional representation of the image to be presented upon the display in an instance in which the display has a first bent configuration, and wherein the at least one memory and the computer program code are configured to, with the at least one processor, cause the apparatus to cause the second, multi-dimensional representation of the image to be presented by causing a second, three-dimensional representation of the image, different than the first, three-dimensional representation of the image, to be presented upon the display in an instance in which the display has a second bent configuration, different than the first bent configuration, and wherein the first and second bent configurations comprise concave and convex configurations.

14. An apparatus according to claim 9 wherein the apparatus is embodied by a mobile terminal.

15. An apparatus according to claim 14 further comprising the display and user interface circuitry arranged to facilitate user control of at least some functions of the mobile terminal through use of the display.

16. An apparatus according to claim 9 wherein the at least one memory and the computer program code are configured to, with the at least one processor, cause the apparatus to determine the degree of bending by determining a radius of curvature of the display.

17. An apparatus according to claim 9 wherein the at least one memory and the computer program code are further configured to, with the at least one processor, cause the apparatus to cause the second, multi-dimensional representation of the image to continue to be presented upon the display in an instance in which the display is bent so as to have a shape, different than the second shape.

18. An apparatus according to claim 17 wherein the at least one memory and the computer program code are further configured to, with the at least one processor, cause the apparatus to:
  detect a triggering condition while the second, multi-dimensional representation of the image continues to be presented upon the display; and
  again permit the multi-dimensional representation of the image to assume a different shape in response to bending of the display following detection of the triggering condition.

19. A computer program product comprising at least one computer-readable storage medium having computer-executable program code portions stored therein, the computer-executable program code portions comprising program instructions configured to:
  cause a first, multi-dimensional representation of an image to be presented upon a display in an instance in which the display has a first shape, wherein the display defines a z-axis extending perpendicular to the display in a planar configuration;
  cause a second, multi-dimensional representation of the image to be presented upon the display in an instance in which the display has a second shape, different than the first shape, wherein the second, multi-dimensional representation has a different dimensionality than the first, multi-dimensional representation; and
  determine a shape of the display such that a corresponding representation of the image is caused to be presented in response thereto,
  wherein the program instructions configured to determine the shape of the display comprise program instructions configured to determine a degree to which the display is bent, and wherein the program instructions configured to cause the second, multi-dimensional representation of the image to be presented comprise program instructions configured to cause the image to be represented along the z-axis in a manner that corresponds to the degree to which the display is bent such that the second, multi-dimensional representation of the image that is caused to be presented in response to a lesser degree of bending in a first direction extends along the z-axis to a different extent than the second, multi-dimensional representation of the image that is caused to be presented in response to a greater degree of bending in the first direction.

20. A computer program product according to claim 19 wherein the display defines a concave space in a bent configuration, and wherein the computer-executable program code portions further comprise program instructions configured to receive a gesture performed within the concave space and causing an action to be taken in response to the gesture.

21. A computer program product according to claim 19 wherein the program instructions configured to cause the first, multi-dimensional representation of the image to be presented comprise program instructions configured to cause a two-dimensional representation of the image to be presented upon the display in an instance in which the display has a planar configuration, and wherein the program instructions configured to cause the second, multi-dimensional representation of the image to be presented comprise program instructions configured to cause a three-dimensional representation of the image to be presented upon the display in an instance in which the display has a bent configuration.

22. A computer program product according to claim 19 wherein the program instructions configured to cause the first, multi-dimensional representation of the image to be presented comprise program instructions configured to cause a first, three-dimensional representation of the image to be presented upon the display in an instance in which the display has a first bent configuration, and wherein the program instructions configured to cause the second, multi-dimensional representation of the image to be presented comprise program instructions configured to cause a second, three-dimensional representation of the image, different than the first, three-dimensional representation of the image, to be presented upon the display in an instance in which the display has a second bent configuration in which the display is bent in a same direction as in the first bent configuration but to a greater or lesser degree than in the first bent configuration.

23. A computer program product according to claim 19 wherein the program instructions configured to cause the first, multi-dimensional representation of the image to be presented comprise program instructions configured to cause a first, three-dimensional representation of the image to be presented upon the display in an instance in which the display has a first bent configuration, and wherein the program instructions configured to cause the second, multi-dimensional representation of the image to be presented comprise program instructions configured to cause a second, three-dimensional representation of the image, different than the first, three-dimensional representation of the image, to be presented upon the display in an instance in which the display has a second bent configuration, different than the first bent configuration, wherein the first and second bent configurations comprise concave and convex configurations.

24. A computer program product according to claim 19 wherein the program instructions configured to determine the degree of bending comprise program instructions configured to determine a radius of curvature of the display.

25. A computer program product according to claim 19 wherein the computer-executable program code portions further comprise program instructions configured to cause the second, multi-dimensional representation of the image to continue to be presented upon the display in an instance in which the display is bent so as to have a shape, different than the second shape.

26. A computer program product according to claim 25 wherein the computer-executable program code portions further comprise program instructions configured to:
  detect a triggering condition while the second, multi-dimensional representation of the image continues to be presented upon the display; and
  again permit the multi-dimensional representation of the image to assume a different shape in response to bending of the display following detection of the triggering condition.

* * * * *

UNITED STATES PATENT AND TRADEMARK OFFICE
CERTIFICATE OF CORRECTION

PATENT NO.        : 9,767,605 B2
APPLICATION NO.   : 13/404098
DATED             : September 19, 2017
INVENTOR(S)       : Arrasvuori et al.

Page 1 of 1

It is certified that error appears in the above-identified patent and that said Letters Patent is hereby corrected as shown below:

In the Drawings

Sheet 7 of 11, FIG. 7, Box "56", Line 1, "geture" should read --gesture--.

In the Claims

Column 13,
Line 61, Claim 9, "n-axis" should read --z-axis--.

Signed and Sealed this
Tenth Day of April, 2018

Andrei Iancu
*Director of the United States Patent and Trademark Office*